(12) United States Patent
Ichiyanagi et al.

(10) Patent No.: US 10,648,746 B2
(45) Date of Patent: May 12, 2020

(54) EXHAUST WASTE HEAT RECOVERY DEVICE

(71) Applicant: CALSONIC KANSEI CORPORATION, Saitama-shi, Saitama (JP)

(72) Inventors: Youhei Ichiyanagi, Saitama (JP); Kazuhiro Idei, Saitama (JP)

(73) Assignee: CALSONIC KANSEI CORPORATION, Saitama-shi (JP)

( * ) Notice: Subject to any disclaimer, the term of this patent is extended or adjusted under 35 U.S.C. 154(b) by 511 days.

(21) Appl. No.: 15/115,036

(22) PCT Filed: Dec. 5, 2014

(86) PCT No.: PCT/JP2014/082252
§ 371 (c)(1),
(2) Date: Jul. 28, 2016

(87) PCT Pub. No.: WO2015/114949
PCT Pub. Date: Aug. 6, 2015

(65) Prior Publication Data
US 2016/0341489 A1     Nov. 24, 2016

(30) Foreign Application Priority Data

Jan. 30, 2014  (JP) ................................. 2014-015112
Jan. 30, 2014  (JP) ................................. 2014-015117

(51) Int. Cl.
*F28D 21/00*          (2006.01)
*F01N 5/02*           (2006.01)
(Continued)

(52) U.S. Cl.
CPC ........... *F28D 21/0003* (2013.01); *F01N 5/02* (2013.01); *F28D 7/005* (2013.01); *F28D 7/08* (2013.01);
(Continued)

(58) Field of Classification Search
CPC ........ F28D 21/0003; F28D 7/005; F28D 7/08; F28D 7/106; F28D 20/0056; F01N 5/02;
(Continued)

(56) References Cited

U.S. PATENT DOCUMENTS 4,096,910 A *  6/1978  Coffinberry ............. F28D 7/106
                                                    165/81
4,493,368 A *  1/1985  Gronnerud ............ F28D 7/1669
                                                    165/159
(Continued)

FOREIGN PATENT DOCUMENTS

CN        101135278 A        3/2008
CN        102652249 A        8/2012
(Continued)

OTHER PUBLICATIONS

Oyama, T., "Learning Heat Transfer Engineering with Examples," pp. 161-163, Mori Kita Publishing, dated Oct. 2012, 6 pages.

*Primary Examiner* — Tho V Duong
(74) *Attorney, Agent, or Firm* — Foley & Lardner LLP

(57) ABSTRACT

An exhaust heat recovery device includes: an exhaust pipe through which exhaust flows; a heat recovery material arranged in the exhaust pipe and recovering heat of the exhaust; a heat medium flow passage through which heat medium recovering the heat recovered by the heat recovery material flows; and an exhaust restriction portion arranged in the exhaust pipe and allowing the exhaust to pass through only part of the heat recovery material.

4 Claims, 7 Drawing Sheets

(51) Int. Cl.
*F28F 9/02* (2006.01)
*F28D 20/00* (2006.01)
*F28D 7/10* (2006.01)
*F28D 7/00* (2006.01)
*F28D 7/08* (2006.01)
*F28F 1/04* (2006.01)
*F28F 3/02* (2006.01)
*F28F 13/06* (2006.01)
*F28F 13/08* (2006.01)

(52) U.S. Cl.
CPC ......... *F28D 7/106* (2013.01); *F28D 20/0056* (2013.01); *F28F 1/04* (2013.01); *F28F 3/02* (2013.01); *F28F 9/0256* (2013.01); *F28F 13/06* (2013.01); *F28F 13/08* (2013.01); *F28D 2021/008* (2013.01); *Y02E 60/142* (2013.01); *Y02T 10/16* (2013.01)

(58) Field of Classification Search
CPC .... F28F 1/04; F28F 3/02; F28F 9/0256; F28F 13/06; F28F 13/08; Y02T 10/16; Y02E 60/142
See application file for complete search history.

(56) References Cited

U.S. PATENT DOCUMENTS

| | | | |
|---|---|---|---|
| 6,089,020 A | | 7/2000 | Kawamura |
| 6,119,457 A | * | 9/2000 | Kawamura ........... F01K 23/065 165/51 |
| 6,696,131 B1 | * | 2/2004 | Nishimura ............... B01J 35/04 422/180 |
| 2008/0053649 A1 | | 3/2008 | Muramatsu et al. |
| 2010/0205946 A1 | * | 8/2010 | Fukudome ............ F01N 3/2889 60/298 |
| 2011/0131961 A1 | * | 6/2011 | Lee ......... F01M 5/001 60/320 |
| 2012/0247732 A1 | | 10/2012 | Suzuki et al. |
| 2013/0167517 A1 | * | 7/2013 | Dupmeier ............. F01K 23/065 60/324 |
| 2017/0191401 A1 | * | 7/2017 | Ichiyanagi ................ F02G 5/02 |

FOREIGN PATENT DOCUMENTS

| | | | | |
|---|---|---|---|---|
| JP | 57-2414 A | | 1/1982 | |
| JP | 10-299472 A | | 11/1998 | |
| JP | 2001073754 A | * | 3/2001 | ............... F01N 5/02 |
| JP | 2008-057820 A | | 3/2008 | |
| JP | 2008175461 A | * | 7/2008 | ............. F28F 13/06 |
| JP | 2009-024565 A | | 2/2009 | |
| JP | 2010-060196 A | | 3/2010 | |
| JP | 2010-229847 A | | 10/2010 | |
| JP | 2012-037165 A | | 2/2012 | |
| JP | 2012-247132 A | | 12/2012 | |
| JP | 2013-228189 A | | 11/2013 | |
| WO | WO-2007/148764 A1 | | 12/2007 | |
| WO | WO-2011/071161 A1 | | 6/2011 | |
| WO | WO-2012/133405 A1 | | 10/2012 | |

* cited by examiner

EXHAUST WASTE HEAT RECOVERY DEVICE

TECHNICAL FIELD

The present invention relates to an exhaust heat recovery device which recovers heat from exhaust by using heat medium and which recovers heat of exhaust of an automobile or the like.

BACKGROUND ART

Patent Document 1 describes an exhaust heat recovery device in which a valve configured to control a flow of exhaust is used to recover exhaust heat in a heat recovery chamber when heat recovery is necessary (for example, when the heat is used for heating in a winter season or the like) and to directly discharge the exhaust by causing the exhaust to flow to a bypass route when the heat recovery is unnecessary.

In the aforementioned exhaust heat recovery device, a heat recovery material is arranged inside a tubular exhaust pipe and an annular heat medium flow passage is arranged outside the exhaust pipe. Heat of high-temperature exhaust (for example, exhaust of an engine of an automobile) flowing inside the exhaust pipe is recovered via the heat recovery material by heat medium such as water flowing through the heat medium flow passage.

Moreover, in the aforementioned exhaust heat recovery device, the heat medium is supplied to the heat medium flow passage from a heat medium supply pipe extending on one side of the annular heat medium flow passage, and the heat medium in the heat medium flow passage is collected by a heat medium collection pipe extending on the other side of the annular heat medium flow passage.

CITATION LIST

Patent Literature

Patent Literature 1: Japanese Unexamined Patent Application Publication No. 2010-229847

SUMMARY OF INVENTION

The heat medium flow passage has a double-circle shape as the aforementioned exhaust heat recovery device is viewed in a direction in which the center axis of the exhaust pipe extends. An annular portion between an inner small circle of the double circle and an outer large circle of the double circle is the heat medium flow passage, and the exhaust flows inside the small circle of the double circle.

The heat medium supply pipe, for example, extends rightward from a right end of the outer large circle of the double circle. The heat medium collection pipe, for example, extends leftward from a left end of the outer large circle of the double circle. The center axis of the heat medium supply pipe and the center axis of the heat medium collection pipe are aligned with each other and are orthogonal to the center axis of the exhaust pipe.

In the aforementioned exhaust heat recovery device configured as described above, the heat medium supplied from the heat medium supply pipe to the heat medium flow passage flows through the heat medium flow passage while being distributed in two directions. Specifically, the heat medium supplied from the heat medium supply pipe at the right end of the large circle to the heat medium flow passage flows to the heat medium collection pipe at the left end of the large circle by flowing through a semi-circular arc shaped heat medium flow passage on the upper side of the heat medium flow passage and a semi-circular arc shaped heat medium flow passage on the lower side of the heat medium flow passage.

To be more specific, the heat medium supplied from the heat medium supply pipe to the heat medium flow passage immediately hits the exhaust pipe (that is, hits the small circle) and is distributed in the two directions. Then, the flow of the heat medium is disturbed when hitting the exhaust pipe and heat recovery efficiency decreases.

An object of the present invention is to provide an exhaust heat recovery device which recovers heat from exhaust by using heat medium and which can prevent decrease of heat recovery efficiency or improve the heat recovery efficiency.

Moreover, another object of the present invention is to provide an exhaust heat recovery device which can suppress turbulence in a flow of heat medium supplied from a heat medium supply pipe to a heat medium flow passage by causing the heat medium to flow to one side and thereby improve the heat recovery efficiency.

An exhaust heat recovery device in accordance with some embodiments includes: an exhaust pipe through which exhaust flows; a heat recovery material arranged in the exhaust pipe and recovering heat of the exhaust; a heat medium flow passage through which heat medium recovering the heat recovered by the heat recovery material flows; and an exhaust restriction portion arranged in the exhaust pipe and allowing the exhaust to pass through only part of the heat recovery material.

The exhaust restriction portion may be arranged upstream of the heat recovery material in a flow direction of the exhaust, and have a tubular shape with an inner diameter smaller than an outer diameter of the heat recovery material.

The exhaust pipe may include a tubular heat recovery material supporting body, the heat recovery material may be arranged inside the heat recovery material supporting body and at an intermediate portion of the heat recovery material supporting body, and the exhaust restriction portion may include a diameter-decreased portion extending into the heat recovery material supporting body.

The diameter-decreased portion may have a tapered shape with an inner diameter smaller toward the heat recovery material.

The diameter-decreased portion may have a tubular shape with a constant inner diameter and a constant outer diameter, the tubular shape being smaller than an outer diameter of the heat recovery material.

The exhaust restriction portion may include a ring-shaped member arranged adjacent to the heat recovery material and upstream of the heat recovery material in a flow direction of the exhaust.

The exhaust restriction portion may be a plurality of exhaust passages arranged only in a center portion of the heat recovery material.

The exhaust restriction portion may restrict a flow of the exhaust in a portion of the heat recovery material near the heat medium flow passage.

The configuration described above can prevent decrease of heat recovery efficiency.

The exhaust heat recovery device may further include: a heat medium supply pipe connected to the heat medium flow passage and having a heat medium supply port for supplying the heat medium to the heat medium flow passage; and a heat medium collection pipe connected to the heat medium flow passage and having a heat medium collection port for collecting the heat medium in the heat medium flow passage, the heat medium collection port being arranged near the heat medium supply port. The heat medium flow passage may have an annular shape and be arranged outside the heat recovery material. In the heat medium flow passage, the heat medium recovering the heat recovered by the heat recovery material may flow along an outer periphery of the heat recovery material. Almost all of the heat medium supplied from the heat medium supply port may flow through a long passage being a roundabout route from the heat medium supply port to the heat medium collection port.

The exhaust heat recovery device may further include: a heat medium supply pipe connected to the heat medium flow passage and having a heat medium supply port for supplying the heat medium to the heat medium flow passage, the heat medium supply pipe having a long linear tube shape with an extending line of a center axis of the long linear tube shape away from a center axis of the exhaust pipe by a predetermined distance as viewed in a direction in which the center axis of the exhaust pipe extends; and a heat medium collection pipe connected to the heat medium flow passage and having a heat medium collection port for collecting the heat medium having flowed through a long passage being a roundabout route from the heat medium supply port to the heat medium collection port, the heat medium collection port being arranged near the heat medium supply port. The heat medium flow passage may have an annular shape and is arranged outside the heat recovery material. In the heat medium flow passage, the heat medium recovering the heat recovered by the heat recovery material may flow along an outer periphery of the heat recovery material.

An extending line of the heat medium supply pipe in a longitudinal direction of the heat medium supply pipe may be away from the center axis of the exhaust pipe by a distance approximately equal to a radius of the heat medium flow passage, as viewed in the direction in which the center axis of the exhaust pipe extends.

An end portion of the heat medium supply pipe at the heat medium supply port may protrude into the annular shape of the heat medium flow passage, and an end of the heat medium supply pipe at the heat medium supply port may be slightly away from an annular inner peripheral wall of the heat medium flow passage.

An end surface of the heat medium supply pipe at the heat medium supply port may be an inclined surface facing away from the heat medium collection port.

An annular outside member of the heat medium flow passage may include an engagement portion engaging with an engaged portion arranged in an end portion of the heat medium supply pipe at the heat medium supply port. Engagement of the engaged portion with the engagement portion in installation of the heat medium supply pipe to the outside member may position the heat medium supply pipe.

The configuration described above can suppress turbulence in a flow of the heat medium supplied from the heat medium supply pipe to the heat medium flow passage by causing the heat medium to flow to one side and thereby improve the heat recovery efficiency.

DESCRIPTION OF EMBODIMENTS

Figure 1:
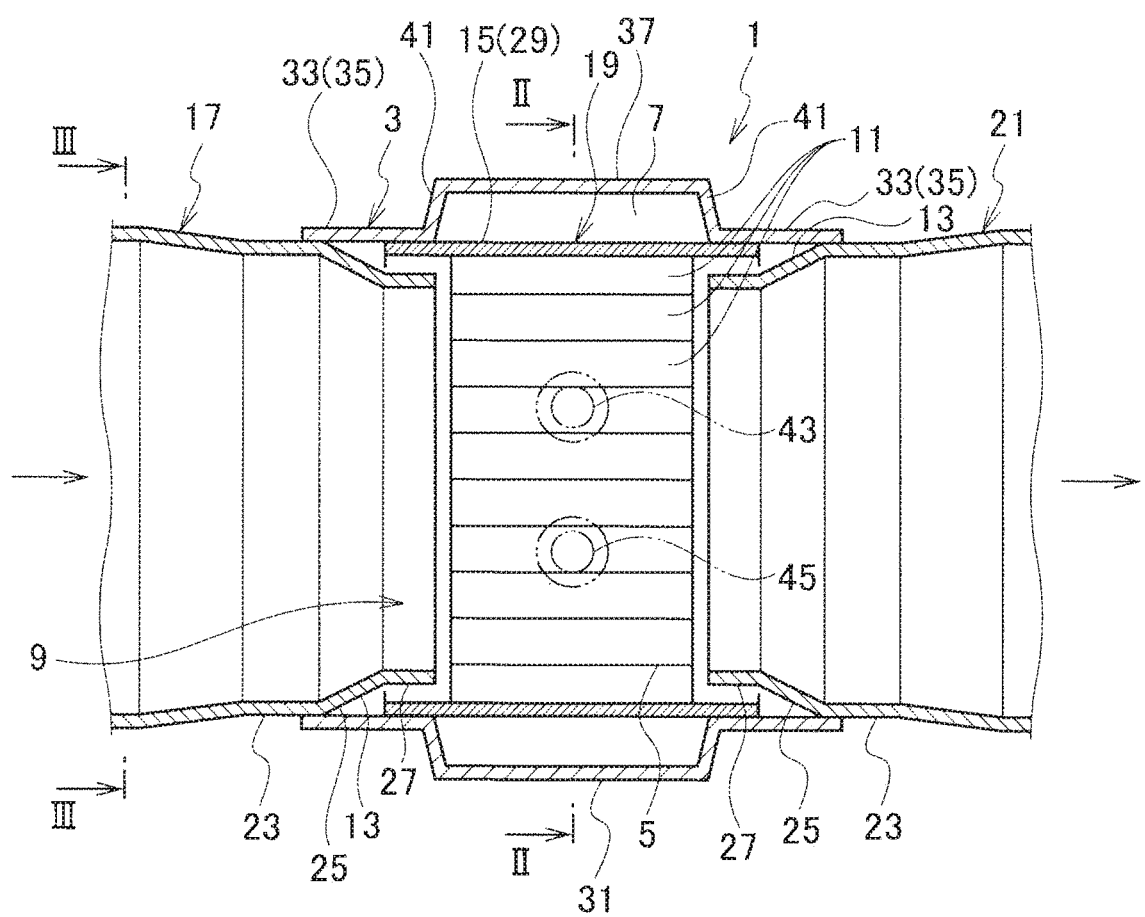
FIG. 1 is a cross-sectional view illustrating a schematic configuration of an exhaust heat recovery device in a first embodiment of the present invention.

An exhaust heat recovery device 1 in a first embodiment of the present invention is described in detail with reference to the drawings. The exhaust heat recovery device 1 recovers, for example, heat of exhaust (exhaust gas) of an automobile. As illustrated in FIG. 1, the exhaust heat recovery device 1 includes an exhaust pipe 3, a heat recovery material (heat storage material) 5, a heat medium flow passage (liquid heat medium flow passage) 7, and an exhaust restriction portion (exhaust blocking section) 9.

The exhaust flows inside the exhaust pipe 3 as illustrated by the arrows of FIG. 1. The heat recovery material 5 is provided with multiple exhaust passages 11. The heat recovery material 5 is installed inside the exhaust pipe 3 such that an outer periphery of the heat recovery material 5 is in contact with an inner wall of the exhaust pipe 3, and recovers heat of the exhaust flowing through the exhaust passages 11.

The heat recovery material 5 is arranged inside the exhaust pipe 3 in an intermediate portion thereof in a direction in which the exhaust flows inside the exhaust pipe 3 (direction in which the center axis of the exhaust pipe 3 extends; a left-right direction in FIG. 1). The entire outer periphery of the heat recovery material 5 is in contact with an inner peripheral surface of the exhaust pipe 3. All exhaust flows inside the exhaust pipe 3 while passing through the exhaust passages 11 of the heat recovery material 5.

The exhaust passages 11 are formed of through holes. The through holes extend in the direction in which the center axis of the exhaust pipe 3 extends. The through holes connect an interior of the exhaust pipe 3 upstream of the heat recovery material 5 in the flow direction of the exhaust and an interior of the exhaust pipe 3 downstream of the heat recovery material 5 in the flow direction of the exhaust to each other. The through holes are distributed substantially evenly as viewed in the direction in which the center axis of the exhaust pipe 3 extends, and are designed such that the heat recovered by the heat recovery material 5 is transferred to the exhaust pipe 3.

The heat medium flow passage 7 is arranged outside the outer periphery of the heat recovery material 5 (outside the outer periphery of the exhaust pipe 3). Heat medium (liquid heat medium such as water or oil) which recovers the heat recovered by the heat recovery material 5 flows through the heat medium flow passage 7.

Figure 2:
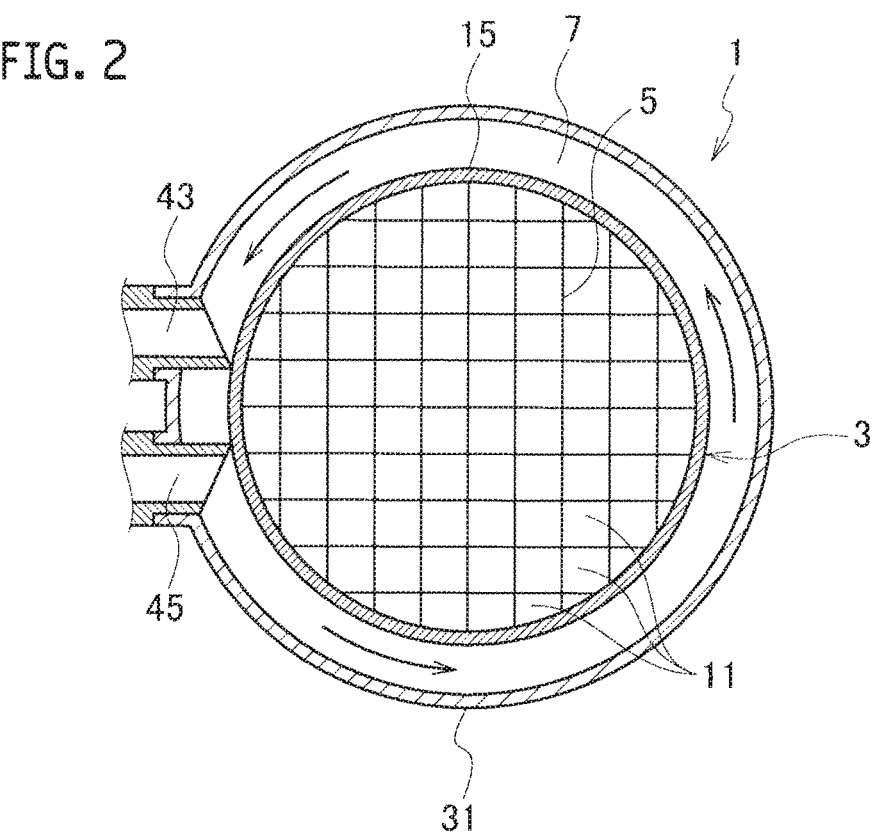
FIG. 2 is a view illustrating the cross section II-II in FIG. 1.

The heat medium flow passage 7 is formed in an annular shape and, as illustrated in FIG. 2, is arranged to surround the heat recovery material 5, outside the heat recovery material 5 and the exhaust pipe 3, as viewed in the direction in which the center axis of the exhaust pipe 3 extends. The heat medium recovering the heat which is recovered by the heat recovery material 5 and transferred through the exhaust pipe 3 flows through the heat medium flow passage 7.

The exhaust restriction portion 9 is configured to suppress (for example, block) a flow of the exhaust in the exhaust passages 11 located in an outer peripheral portion of the heat recovery material 5. Specifically, the exhaust restriction portion 9 is configured to suppress the flow of exhaust in a ring-shaped portion illustrated in FIG. 3 which is between the circle C1 and the circle C2 and is indicated by diagonal lines.

The exhaust restriction portion 9 is formed of a tubular diameter-decreased portion 13. The diameter-decreased portion 13 is arranged upstream of the heat recovery material 5 in the flow direction of the exhaust. The inner diameter of the diameter-decreased portion 13 is smaller than the outer diameter of the heat recovery material 5. The flow of exhaust in the exhaust passages 11 located in the outer peripheral portion of the heat recovery material 5 is thereby suppressed.

The heat recovery material 5 is arranged inside a tubular heat recovery material supporting body 15 forming part of the exhaust pipe 3, in an intermediate portion of the heat recovery material supporting body 15 (intermediate portion in the direction in which the center axis of the heat recovery material supporting body 15 extends). The outer diameter of the diameter-decreased portion 13 is smaller than the inner diameter of the heat recovery material supporting body 15. The diameter-decreased portion 13 extends into the heat recovery material supporting body 15 while being coaxial with the heat recovery material supporting body 15. Specifically, in FIG. 1, a right end of the diameter-decreased portion 13 is located on the right side of a left end of the heat recovery material supporting body 15.

The diameter-decreased portion 13 is formed in a tapered shape such that the inner diameter thereof is smaller on the heat recovery material 5 side (downstream side in the flow of the exhaust).

The exhaust pipe 3 is formed in, for example, a cylindrical shape with small thickness, and includes a tubular upstream section (upstream exhaust pipe) 17 arranged upstream of the heat recovery material 5 in the flow direction of the exhaust, an intermediate section 19 located in a portion where the heat recovery material 5 and the heat medium flow passage 7 exist, and a tubular downstream section (downstream exhaust pipe) 21 arranged downstream of the heat recovery material 5 in the flow direction of the exhaust. The upstream section 17, the intermediate section 19, and the downstream section 21 are separate from one another.

The upstream section 17 includes a cylindrical fitting portion 23 and the diameter-decreased portion 13. The diameter-decreased portion 13 includes a cylindrical small diameter portion 27 and a tapered portion 25 with a circular truncated cone shaped side surface. The fitting portion 23, the tapered portion 25, and the small diameter portion 27 are arranged in this order in the flow direction of the exhaust. The diameter of the tapered portion 25 gradually becomes smaller from the upstream side to the downstream side in the flow direction of the exhaust. The diameter of the fitting portion 23 is the same as the diameter of an end portion of the tapered portion 25 (diameter of an upstream end portion in the flow direction of the exhaust). The diameter of the small diameter portion 27 is the same as the diameter of an end portion of the tapered portion 25 (diameter of a downstream end portion in the flow direction of the exhaust). The downstream section 21 is formed in the same shape as the upstream section 17 to be symmetric thereto.

The intermediate section 19 includes an inner intermediate section 29 formed of the heat recovery material supporting body 15 and an outer intermediate section 33 formed of small diameter portions 35 of a heat medium flow passage forming body 31 forming the heat medium flow passage 7 with the heat recovery material supporting body 15 outside the inner intermediate section 29.

The heat recovery material supporting body 15 is formed in a cylindrical shape. The inner diameter of the heat recovery material supporting body 15 is greater than the outer diameter of the small diameter portion 27 of the diameter-decreased portion 13. The outer diameter of the heat recovery material supporting body 15 is substantially the same as the outer diameter of the fitting portion 23 of the upstream section 17.

The heat medium flow passage forming body 31 includes a cylindrical large diameter portion 37, the paired cylindrical small diameter portions 35, and paired connection portions 41. The paired small diameter portions 35 are provided at both ends of the large diameter portion 37. The connection portions 41 connect the small diameter portions 35 and the large diameter portion 37 to one another.

The inner diameter of each small diameter portion 35 is the same as the outer diameters of the heat recovery material supporting body 15 and the fitting portion 23. The length dimension of the heat medium flow passage forming body 31 (dimension in the direction in which the center axis extends) is greater than the length dimension of the heat recovery material supporting body 15.

The annular heat medium flow passage 7 is formed by providing the heat recovery material supporting body 15 inside the heat medium flow passage forming body 31. The outer diameter of the heat medium flow passage 7 is greater than the outer diameter of the upstream section 17.

One of the small diameter portions 35 (one on the upstream side in the flow of the exhaust) of the heat medium flow passage forming body 31 protrudes beyond the heat recovery material supporting body 15 (protrudes leftward in FIG. 1). The other small diameter portion 35 (one on the downstream side in the flow of the exhaust) of the heat medium flow passage forming body 31 also protrudes beyond the heat recovery material supporting body 15 (protrudes rightward in FIG. 1).

The fitting portion 23 of the upstream section 17 extends into the one small diameter portion 35 of the heat medium flow passage forming body 31 and is fitted thereto, while the fitting portion 23 of the downstream section 21 extends into the other small diameter portion 35 of the heat medium flow passage forming body 31 and is fitted thereto. The upstream section 17, the small diameter portions 35 of the heat medium flow passage forming body 31 of the intermediate section 19, the heat recovery material supporting body 15, and the downstream section 21 thereby form the exhaust pipe 3. Note that the upstream section 17, the intermediate section 19, and the downstream section 21 are coaxial with one another.

The heat medium flow passage 7 is provided with a heat medium supply port 43 for supplying the heat medium to the heat medium flow passage 7 and a heat medium collection port 45 for collecting the heat medium from the heat medium flow passage 7.

Note that, in the exhaust heat recovery device 1 illustrated in FIG. 1, the diameter-decreased portion 13 of the downstream section 21 may be omitted.

Next, operations of the exhaust heat recovery device 1 are described.

As illustrated by the arrows of FIG. 1, the high-temperature exhaust flows inside the exhaust pipe 3 and the heat medium flows through the heat medium flow passage 7.

The exhaust is slightly squeezed by the diameter-decreased portion 13 of the upstream section 17 of the exhaust pipe 3 and the flow passage area becomes smaller. The exhaust then flows through the exhaust passages 11 of the heat recovery material 5 which are located inside the circle C1 of FIG. 3. No exhaust thereby flows in the outer peripheral portion of the heat recovery material 5 (the ring-shaped portion illustrated in FIG. 3 which is between the circle C1 and the circle C2 and is indicated by the diagonal lines).

Figure 3:
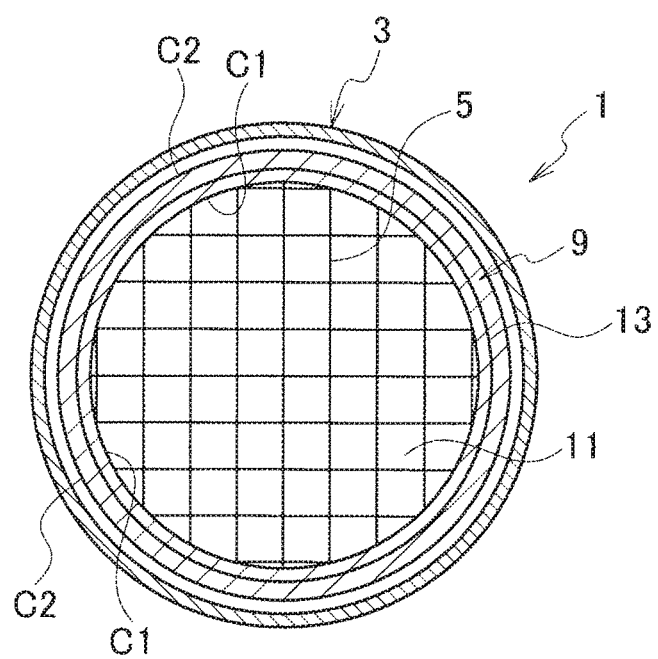
FIG. 3 is a view illustrating the cross section in FIG. 1.

The exhaust flowing through the exhaust passages 11 inside the circle C1 in FIG. 3 heats the heat recovery material 5. This heat is transferred through the heat recovery material supporting body 15 to heat the heat medium in the heat medium flow passage 7, and heat recovery is thereby achieved.

Since the exhaust heat recovery device 1 is provided with the exhaust restriction portion 9, no exhaust flows through the exhaust passages 11 located in the outer peripheral portion of the heat recovery material 5, or even if the exhaust flows therethrough, only a small amount of the exhaust flows. In other words, the exhaust flows through a portion away from the heat medium flow passage 7 and no exhaust flows through a portion near the heat medium flow passage 7. This prevents the case where the heat medium in the heat medium flow passage 7 is locally boiled by the heat of the exhaust, and can prevent a decrease in heat recovery efficiency.

Moreover, the exhaust heat recovery device 1 is provided with no valve configured to control the flow of the exhaust, and is configured such that the exhaust always flows through the heat recovery material 5 without being made to flow through a bypass route. This enables efficient recovery of the exhaust heat by the heat recovery material 5 and the heat medium flow passage 7.

Furthermore, in the exhaust heat recovery device 1, since the exhaust restriction portion 9 is formed of the tubular diameter-decreased portion 13 and the exhaust passes inside the diameter-decreased portion 13, the flow of the exhaust is stable (a stream line of the exhaust coincides with the direction in which the center axis of the diameter-decreased portion 13 extends). It is thereby possible to suitably suppress the flow of exhaust to the exhaust passages 11 located in the outer peripheral portion of the heat recovery material 5.

Moreover, in the exhaust heat recovery device 1, the diameter-decreased portion 13 extends into the heat recovery material supporting body 15, and the diameter-decreased portion 13 and the heat recovery material 5 are thus arranged close to each other. It is thereby possible to more suitably suppress the flow of exhaust to the exhaust passages 11 located in the outer peripheral portion of the heat recovery material 5.

Furthermore, in the exhaust heat recovery device 1, the diameter-decreased portion 13 is formed in a tapered shape such that the inner diameter is smaller on the heat recovery material 5 side (downstream side in the flow direction of the exhaust). The exhaust exiting the diameter-decreased portion 13 thereby flows to be concentrated in a center portion of the heat recovery material 5, and the flow of exhaust to the exhaust passages 11 located in the outer peripheral portion of the heat recovery material 5 can be surely restricted. Accordingly, occurrence of heat spot which is a local high-temperature portion can be suppressed, and local boiling of the heat medium is prevented.

Figure 4:
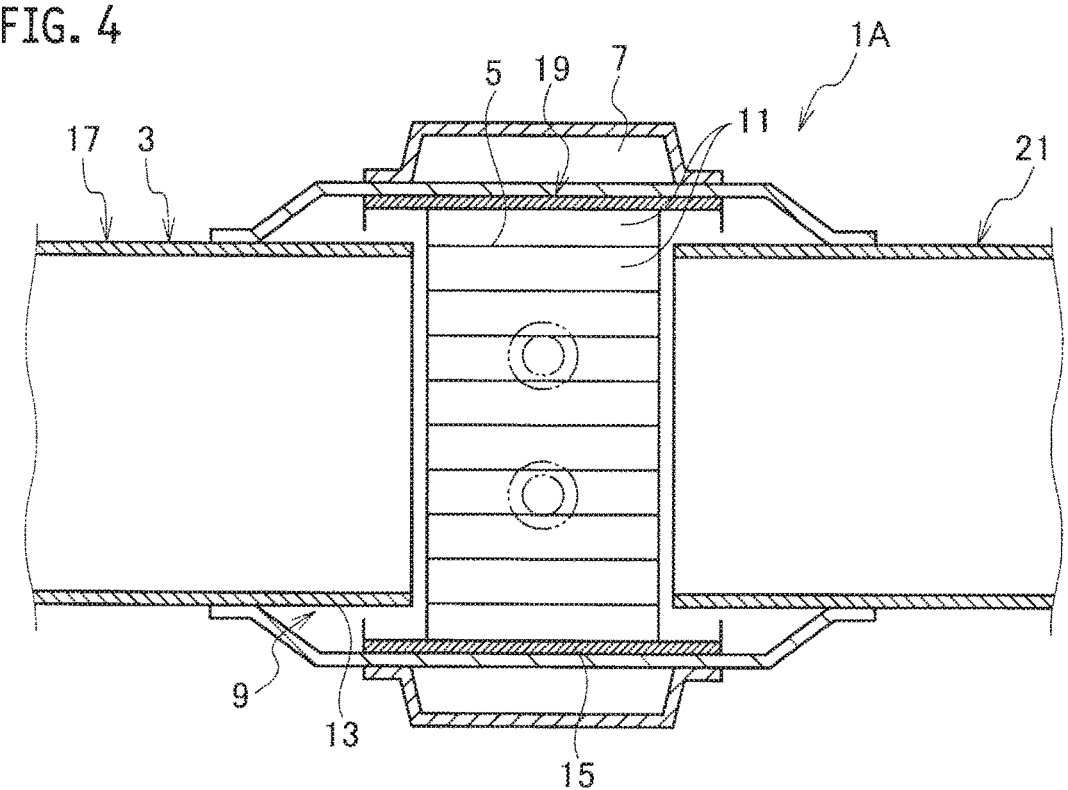
FIG. 4 is a cross-sectional view illustrating a schematic configuration of an exhaust heat recovery device in a modified example of the first embodiment.

The configuration of the exhaust heat recovery device 1 can be changed as appropriate as described below. An exhaust heat recovery device 1A in a first modified example is described with reference to FIG. 4.

The diameter-decreased portion 13 (upstream section 17) is formed in a tubular shape (for example, cylindrical shape) having constant inner diameter and outer diameter which are smaller than the outer diameter of the heat recovery material 5. The inner diameters of the heat medium flow passage 7 and the heat recovery material supporting body 15 are naturally greater than the outer diameter of the diameter-decreased portion 13. Manufacturing of the diameter-decreased portion 13 (upstream section 17) is thereby facilitated.

Figure 5:
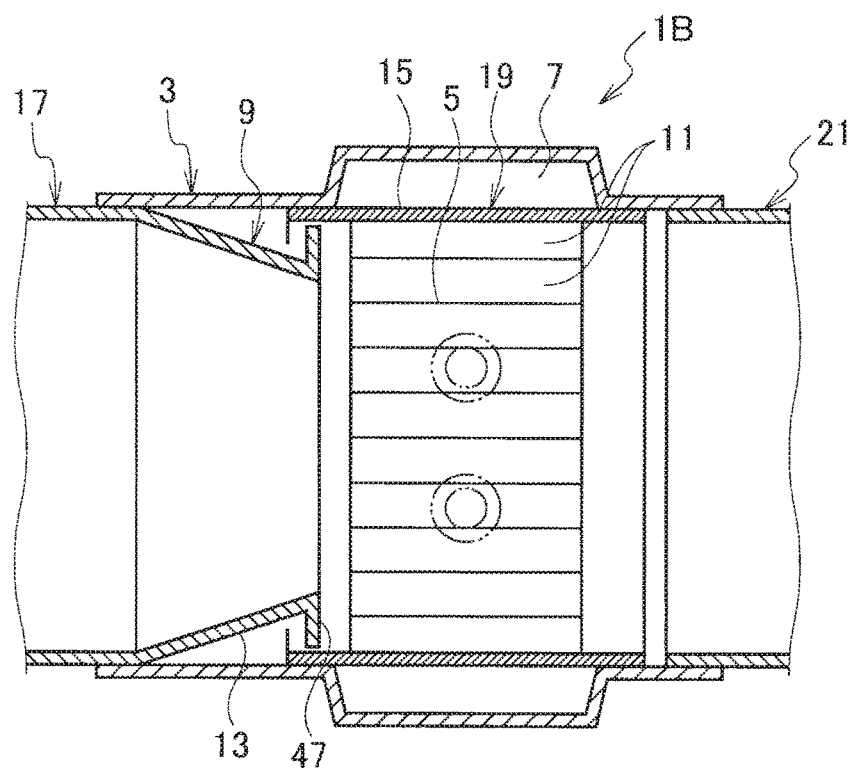
FIG. 5 is a cross-sectional view illustrating a schematic configuration of an exhaust heat recovery device in another modified example of the first embodiment.

An exhaust heat recovery device 1B in a second modified example is described with reference to FIG. 5. The exhaust heat recovery device 1B in the second modified example is provided with a ring-shaped flange portion 47 at a front end of the tapered diameter-decreased portion 13 of the upstream section 17. The diameter-decreased portion 13 of the downstream section 21 is omitted.

Figure 6:
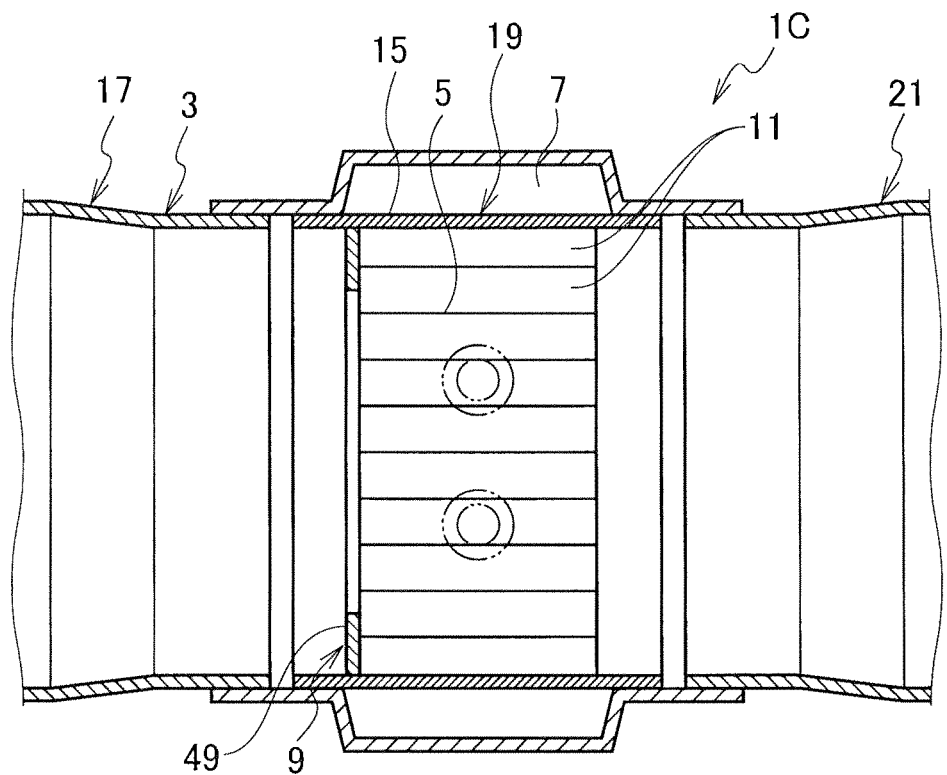
FIG. 6 is a cross-sectional view illustrating a schematic configuration of an exhaust heat recovery device in yet another modified example of the first embodiment.

An exhaust heat recovery device 1C in a third modified example is described with reference to FIG. 6. In the exhaust heat recovery device 1C in the third modified example, the exhaust restriction portion 9 is formed of a ring-shaped member 49 arranged adjacent to the heat recovery material 5 on the upstream in the flow direction of the exhaust (for example, in contact therewith).

The ring-shaped member 49 forming the exhaust restriction portion 9 can simplify the configuration of the exhaust heat recovery device 1.

In the exhaust heat recovery device (not illustrated) in a fourth modified example, the exhaust restriction portion 9 is formed by providing the multiple exhaust passages 11 only in the center portion of the heat recovery material 5. This simplifies assembly work and maintenance work of the exhaust heat recovery device.

Note that the exhaust heat recovery devices 1, 1A, 1B, and 1C described above are each an example of the exhaust heat recovery device provided with the exhaust pipe and the multiple exhaust passages through which the exhaust flows, the heat recovery device including: the heat recovery material which is installed inside the exhaust pipe and which recovers the heat of the exhaust flowing through the exhaust passages; the heat medium flow passages which is arranged on the exhaust pipe and through which the heat medium recovering the heat recovered by the heat recovery material flows; and the exhaust restriction portion which restricts the flow of the exhaust in the portion of the heat recovery material near the heat medium flow passage.

Figure 7:
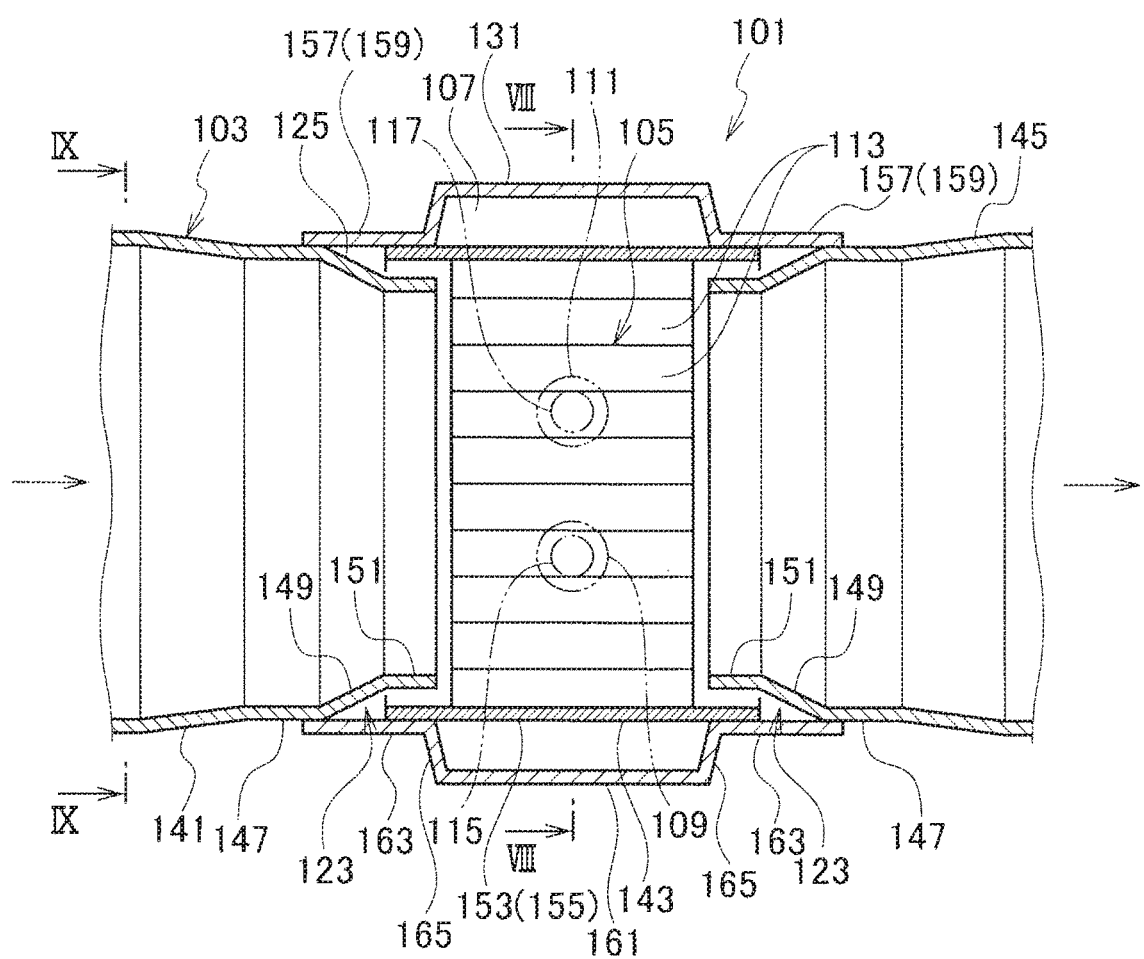
FIG. 7 is a cross-sectional view illustrating a schematic configuration of an exhaust heat recovery device in a second embodiment of the present invention.
Figure 8:
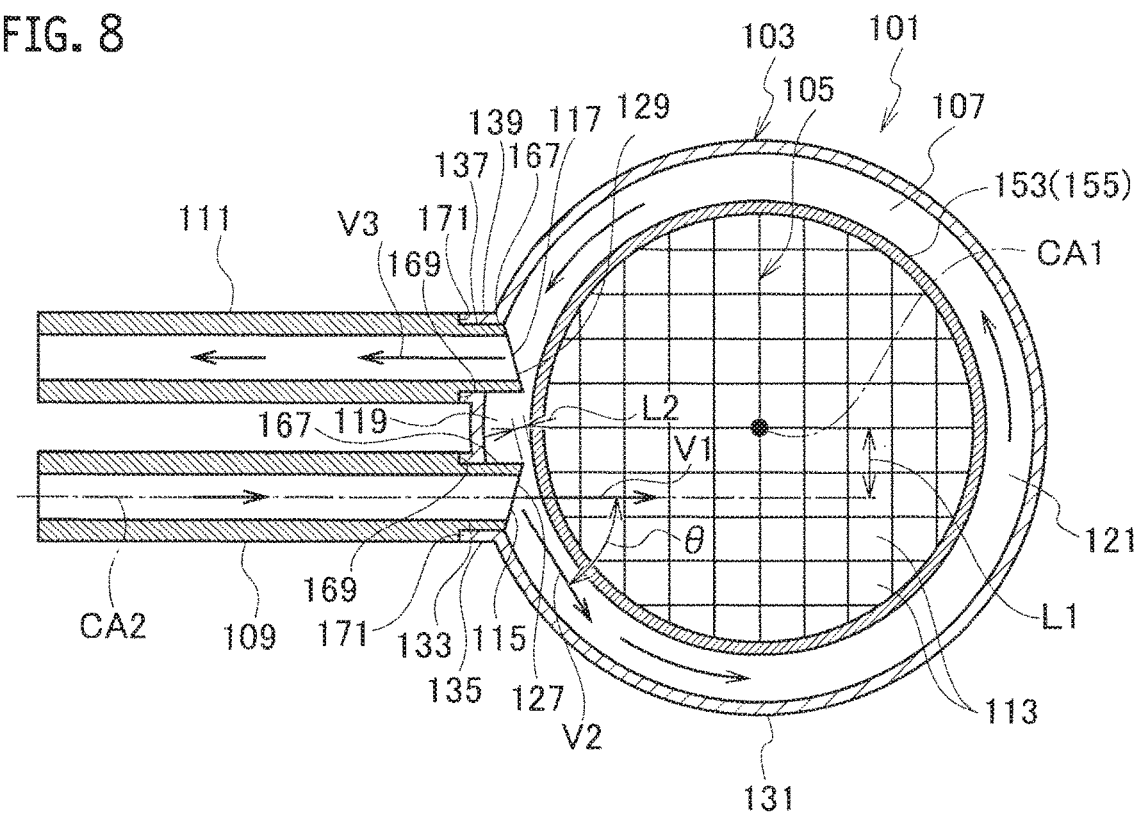
FIG. 8 is a view illustrating the cross section VIII-VIII in FIG. 7.
Figure 9:
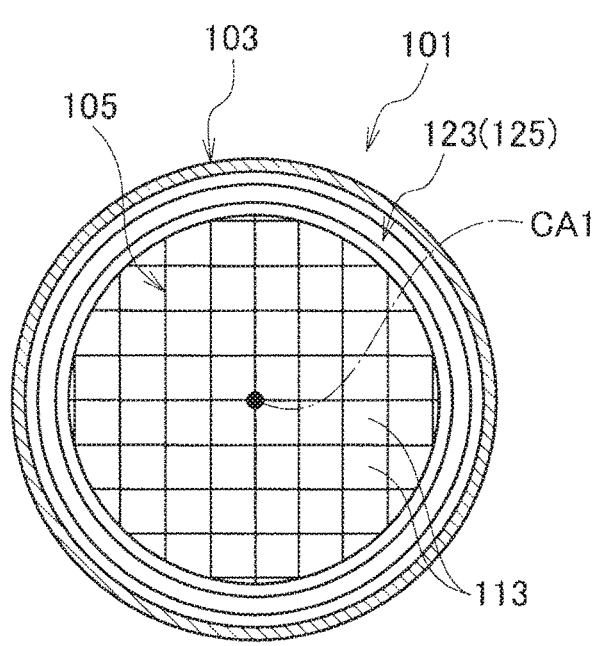
FIG. 9 is a view illustrating the cross section IX-IX in FIG. 7.

Next, an exhaust heat recovery device 101 in a second embodiment of the present invention is described in detail with reference to the drawings. The exhaust heat recovery device 101 recovers, for example, heat of exhaust (exhaust gas) of an automobile. As illustrated in FIGS. 7 to 9, the exhaust heat recovery device 101 includes an exhaust pipe 103, a heat recovery material (heat storage material) 105, a heat medium flow passage (liquid heat medium flow passage) 107, a heat medium supply pipe 109, and a heat medium collection pipe 111.

The exhaust flows inside the exhaust pipe 103 as illustrated by the arrows of FIG. 7. The heat recovery material 105 is provided with multiple exhaust passages 113. The heat recovery material 105 is installed inside the exhaust pipe 103 such that an outer periphery of the heat recovery material 105 is in contact with an inner wall of the exhaust pipe 103, and recovers heat of the exhaust flowing through the exhaust passages 113.

The heat recovery material 105 is arranged inside the exhaust pipe 103 in an intermediate portion thereof in a direction in which the exhaust flows inside the exhaust pipe 103 (direction in which a center axis CA1 of the exhaust pipe 103 extends; a left-right direction in FIG. 7). The entire outer periphery of the heat recovery material 105 is in contact with an inner peripheral surface of the exhaust pipe 103. All exhaust flows inside the exhaust pipe 103 while passing through the exhaust passages 113 of the heat recovery material 105.

The exhaust passages 113 are formed of through-holes. The through holes extend in the direction in which the center axis CA1 of the exhaust pipe 103 extends. The through holes connect an interior of the exhaust pipe 103 upstream of the heat recovery material 105 in the flow direction of the exhaust and an interior of the exhaust pipe 103 downstream of the heat recovery material 105 in the flow direction of the exhaust to each other. As illustrated in FIG. 8 and the like, the through holes are distributed substantially evenly as viewed in the direction in which the center axis CA1 of the exhaust pipe 103 extends, and are designed such that the heat recovered by the heat recovery material 105 is transferred to the exhaust pipe 103.

The heat medium flow passage 107 is arranged outside the outer periphery of the heat recovery material 105 (outside the outer periphery of the exhaust pipe 103). Heat medium (liquid heat medium such as water or oil) which recovers the heat recovered by the heat recovery material 105 flows through the heat medium flow passage 107.

The heat medium flow passage 107 is arranged outside the exhaust pipe 103 in the intermediate portion of the exhaust pipe 103 in the longitudinal direction thereof (left-right direction in FIG. 7). The heat medium flow passage 107 is formed in an annular shape (for example, circular ring shape) as illustrated in FIG. 8, and is arranged to surround the heat recovery material 105 outside the heat recovery material 105 and the exhaust pipe 103 as viewed in the direction in which the center axis CA1 of the exhaust pipe 103 extends. The heat medium recovering the heat which is recovered by the heat recovery material 105 and transferred through the exhaust pipe 103 flows through the heat medium flow passage 107 along the outer periphery of the heat recovery material 105 (flows along the annular ring).

The heat medium supply pipe 109 has one end in the longitudinal direction connected to the heat medium flow passage 107, and supplies the heat medium to the heat medium flow passage 107 from a heat medium supply port 115 at the one end.

The heat medium collection pipe 111 has one end in the longitudinal direction connected to the heat medium flow passage 107, and collects the heat medium in the heat medium flow passage 107 (heat medium having been supplied from the heat medium supply pipe 109 and having flowed through the heat medium flow passage 107) from a heat medium collection port 117 at the one end. The heat medium collection port 117 at the one end of the heat medium collection pipe 111 is arranged near the heat medium supply port 115 in a circumferential direction of the annular heat medium flow passage 107.

In the exhaust heat recovery device 101, for example, the heat medium supply pipe 109 and the heat medium supply port 115 are offset from the center axis CA1 of the annular heat medium flow passage 107, and the heat medium supply pipe 109 is formed to be long. The exhaust heat recovery device 101 is thereby configured such that almost all of the heat medium supplied from the heat medium supply port 115 flows to a long passage 121 of the annular heat medium flow passage 107 without flowing to a short passage 119 of the annular heat medium flow passage 107 and reaches the heat medium collection port 117.

The short passage 119 is a shortcut route from the heat medium supply port 115 to the heat medium collection port 117 in the annular heat medium flow passage 107. The long passage 121 is a roundabout route from the heat medium supply port 115 to the heat medium collection port 117 in the annular heat medium flow passage 107. Since the heat medium collection port 117 is arranged near the heat medium supply port 115 in the circumferential direction of the annular heat medium flow passage 107, the heat medium flowing through the long passage 121 flows along the annular heat medium flow passage 107 almost in a complete circle.

Almost all of the heat medium supplied from the heat medium supply pipe 109 to the heat medium flow passage 107 flows through the long passage 121. For example, 70% or more, preferably 80% or more, more preferably 90% or more, even more preferably 98% or more of the heat medium by mass flows through the long passage 121.

In the exhaust heat recovery device 101, as illustrated in FIG. 8, an angle θ between a velocity vector (supply port velocity vector) V1 of the heat medium flowing out from the heat medium supply port 115 of the heat medium supply pipe 109 and a velocity vector (supply port vicinity velocity vector) V2 of the heat medium (heat medium flowing toward the long passage 121 that is away from the heat medium collection port 117) flowing through the annular heat medium flow passage 107 near the heat medium supply port 115 is an acute angle (for example, 60° or smaller). In other words, the value of cos θ in the inner product between the supply port velocity vector V1 and the supply port vicinity velocity vector V2 is equal to or greater than "0" (for example, equal to or greater than "½").

The heat medium supply port 115 and the heat medium collection port 117 are arranged at such positions that the heat medium supplied from the heat medium supply port 115 enters the heat medium collection port 117 after flowing along the annular heat medium flow passage 107 almost in a complete circle. For example, a reflex angle (angle on the long passage 121 side) out angles of an intersection between a line segment connecting the center axis CA1 of the exhaust pipe 103 and the heat medium supply port 115 and a line segment connecting the center axis CA1 of the exhaust pipe 103 and the heat medium collection port 117 is about 330° to 360° (one circle) as viewed in the direction in which the center axis CA1 of the exhaust pipe 103 extends.

The exhaust heat recovery device 101 is provided with an exhaust restriction portion (exhaust block portion) 123. The exhaust restriction portion 123 is configured to suppress a flow of the exhaust in the exhaust passages 113 located in an outer peripheral portion of the heat recovery material 105.

The exhaust restriction portion 123 is formed of a tubular diameter-decreased portion 125. The diameter-decreased portion 125 is arranged upstream of the heat recovery material 105 in the flow direction of the exhaust. The inner diameter of the diameter-decreased portion 125 is smaller than the outer diameter of the heat recovery material 105. The flow of exhaust in the exhaust passages 113 located in the outer peripheral portion of the heat recovery material 105 is thereby restricted.

The exhaust heat recovery device 101 is further described.

As illustrated in FIG. 8, the heat medium supply pipe 109 is formed in a long linear tube shape, and the one end thereof in the longitudinal direction is connected to the heat medium flow passage 107. As viewed in the direction in which the center axis CA1 of the exhaust pipe 103 extends, an extending line of a center axis CA2 of the heat medium supply pipe 109 is arranged away from the center axis CA1 of the exhaust pipe 103 by a predetermined distance L1.

As illustrated in FIG. 8, the heat medium collection pipe 111 is also formed in a long linear tube shape, and the one end thereof in the longitudinal direction is connected to the heat medium flow passage 107. The heat medium collection port 117 is arranged near the heat medium supply port 115 in the circumferential direction of the annular heat medium flow passage 107, and the heat medium having flowed through the long passage 121 is collected from the heat medium collection port 117.

As viewed in the direction in which the center axis CA1 of the exhaust pipe 103 extends, the heat medium collection port 117 is arranged on the opposite side (for example, at a symmetric position) to the heat medium supply port 115 across the center axis CA1 of the exhaust pipe 103 in a direction orthogonal to the extending line of the center axis CA2 of the heat medium supply pipe 109 (up-down direction in FIG. 8).

As viewed in the direction in which the center axis CA1 of the exhaust pipe 103 extends, a velocity vector V3 of the heat medium at the heat medium collection port 117 is, for example, opposite in direction to the velocity vector V1 of the heat medium at the heat medium supply port 115 (see FIG. 8). Note that an angle between the velocity vectors V1 and V3 may be an obtuse angle.

The heat medium collection pipe 111 formed in the long linear tube shape like the heat medium supply pipe 109 is arranged adjacent to the heat medium supply pipe 109 to extend parallel to the heat medium supply pipe 109 in an elongated manner.

The length of the heat medium supply pipe 109 is substantially the same as the outer diameter of the annular heat medium flow passage 107, but may be greater than the inner diameter of the annular heat medium flow passage 107 and smaller than the outer diameter of the annular heat medium flow passage 107.

Note that, when the heat medium flowing out from the heat medium supply port 115 is a steady flow and the stream line of the heat medium flowing out from the heat medium supply port 115 extends in the longitudinal direction of the heat medium supply pipe 109, there is no need to limit the length of the heat medium supply pipe 109 to the length described above. For example, the length of the heat medium supply pipe 109 may be any value between 0.5 times the inner diameter of the annular heat medium flow passage 107 and three times the outer diameter of the heat medium flow passage 107, or may be a value equal to or greater than three times the outer diameter of the heat medium flow passage 107.

As illustrated in FIG. 8, an end portion of the heat medium supply pipe 109 on the heat medium supply port 115 side protrudes into the annular heat medium flow passage 107. An end (front end) of the heat medium supply pipe 109 on the heat medium supply port 115 is arranged slightly away (away by a distance of L2) from an inner peripheral wall (exhaust pipe 103 forming the inner wall) of the annular heat medium flow passage 107.

An end portion of the heat medium collection pipe 111 on the heat medium collection port 117 side also protrudes into the annular heat medium flow passage 107. An end of the heat medium collection pipe 111 on the heat medium collection port 117 side is also arranged slightly away from the inner peripheral wall of the annular heat medium flow passage 107.

An end surface 127 of the heat medium supply pipe 109 on the heat medium supply port 115 side is an inclined surface facing away from the heat medium collection port 117 (long passage 121 side). Similarly, an end surface 129 of the heat medium collection pipe 111 on the heat medium collection port 117 side is an inclined surface facing away from the heat medium supply port 115 (long passage 121 side).

An outer member 131 forming the annular heat medium flow passage 107 is provided with an engagement portion 135 which engages with an engaged portion 133 arranged in the end portion of the heat medium supply pipe 109 on the heat medium supply port 115 side. When the heat medium supply pipe 109 is installed to the outer member 131, the engaged portion 133 is engaged with the engagement portion 135 and, for example, the heat medium supply pipe 109 is positioned relative to the heat medium flow passage 107 in the longitudinal direction of the heat medium supply pipe 109.

The outer member 131 is provided with an engagement portion 139 which engages with an engaged portion 137 arranged in the end portion of the heat medium collection pipe 111 on the heat medium collection port 117 side. When the heat medium collection pipe 111 is installed to the outer member 131, the engaged portion 137 is engaged with the engagement portion 139 and the heat medium collection pipe 111 is positioned as in the case of the heat medium supply pipe 109.

The exhaust pipe 103 is formed in, for example, a cylindrical shape with small thickness. The exhaust pipe 103 includes a tubular upstream section (upstream exhaust pipe) 141 arranged upstream of the heat recovery material 105 in the flow direction of the exhaust, an intermediate section 143 located in a portion where the heat recovery material 105 and the heat medium flow passage 107 exist, and a tubular downstream section (downstream exhaust pipe) 145 arranged downstream of the heat recovery material 105 in the flow direction of the exhaust. The upstream section 141, the intermediate section 143, and the downstream section 145 are separate from one another.

The upstream section 141 includes a cylindrical fitting portion 147 and the diameter-decreased portion 125. The diameter-decreased portion 125 includes a cylindrical small diameter portion 151 and a tapered portion 149 with a circular truncated cone shaped side surface. The fitting portion 147, the tapered portion 149, and the small diameter portion 151 are arranged in this order in the flow direction of the exhaust. The diameter of the tapered portion 149 gradually becomes smaller from the upstream side to the downstream side in the flow direction of the exhaust. The diameter of the fitting portion 147 is the same as the diameter of an end portion of the tapered portion 149 (diameter of an upstream end portion in the flow direction of the exhaust). The diameter of the small diameter portion 151 is the same as the diameter of an end portion of the tapered portion 149 (diameter of a downstream end portion in the flow direction of the exhaust). The downstream section 145 is formed in the same shape as the upstream section 141 to be symmetric thereto.

The intermediate section 143 includes an inner intermediate section 155 formed of a heat recovery material supporting body 153 and small diameter portions 157 (outer intermediate section 159) of the outer member (heat medium flow passage forming body) 131 forming the heat medium flow passage 107 with the heat recovery material supporting body 153 outside the inner intermediate section 155.

The heat recovery material supporting body 153 is formed in a cylindrical shape. The inner diameter of the heat recovery material supporting body 153 is greater than the outer diameter of the small diameter portion 151 of the diameter-decreased portion 125. The outer diameter of the heat recovery material supporting body 153 is substantially the same as the outer diameter of the fitting portion 147 of the upstream section 141.

The heat medium flow passage forming body 131 includes a cylindrical large diameter portion 161, the paired cylindrical small diameter portions 163, and paired connection portions 165. The paired small diameter portions 163 are provided at both ends of the large diameter portion 161. The connection portions 165 connect the small diameter portions 163 and the large diameter portion 161 to one another.

The inner diameter of each small diameter portion 163 is the same as the outer diameters of the heat recovery material supporting body 153 and the fitting portion 147. The length dimension of the heat medium flow passage forming body 131 (dimension in the direction in which the center axis CA1 extends) is greater than the length dimension of the heat recovery material supporting body 153.

The annular heat medium flow passage 107 is formed by providing the heat recovery material supporting body 153 inside the heat medium flow passage forming body 131. The outer diameter of the heat medium flow passage 107 is greater than the outer diameter of the upstream section 141.

One of the small diameter portions 163 (one on the upstream side in the flow of the exhaust) of the heat medium flow passage forming body 131 protrudes beyond the heat recovery material supporting body 153 (protrudes leftward in FIG. 7). The other small diameter portion 163 (one on the downstream side in the flow of the exhaust) of the heat medium flow passage forming body 131 also protrudes beyond the heat recovery material supporting body 153 (protrudes rightward in FIG. 7).

The fitting portion 147 of the upstream section 141 extends into the one small diameter portion 163 of the heat medium flow passage forming body 131 and is fitted thereto, while the fitting portion 147 of the downstream section 145 extends into the other small diameter portion 163 of the heat medium flow passage forming body 131 and is fitted thereto. The upstream section 141, the small diameter portions 163 of the heat medium flow passage forming body 131 of the intermediate section 143, the heat recovery material supporting body 153, and the downstream section 145 thereby form the exhaust pipe 103. The upstream section 141, the intermediate section 143, and the downstream section 145 are coaxial with one another.

Note that, in the exhaust heat recovery device 101 illustrated in FIG. 7, the diameter-decreased portion 125 of the downstream section 145 may be omitted.

The large diameter portion 161 of the heat medium flow passage forming body 131 is provided with through holes. The heat medium supply pipe 109 and the heat medium collection pipe 111 are provided respectively for the through holes.

The engaged portion 133 of the heat medium supply pipe 109 is formed of a cylindrical small diameter portion 167 formed in the one end portion of the heat medium supply pipe 109 in the longitudinal direction. A step 169 is formed at a base end of the small diameter portion 167. The engagement portion 135 of the heat medium flow passage forming body 131 which engages with the engaged portion 133 of the heat medium supply pipe 109 is formed of a cylindrical protrusion 171 which protrudes and stands up from an outer peripheral portion of the through hole of the large diameter portion 161 in the heat medium flow passage forming body 131. The inner diameter of the protrusion 171 is the same as the outer diameter of the small diameter portion 167.

The heat medium supply pipe 109 is configured to be positioned relative to the heat medium flow passage forming body 131 by inserting the small diameter portion 167 of the heat medium supply pipe 109 into the protrusion 171 and bringing the step 169 into contact with a front end of the protrusion 171.

The engaged portion 137 of the heat medium collection pipe 111 and the engagement portion 139 which engages with the engaged portion 137 are also configured in a similar manner to the engaged portion 133 of the heat medium supply pipe 109 and the engagement portion 135 which engages with the engaged portion 133.

Next, operations of the exhaust heat recovery device 101 are described.

As illustrated by the arrows of FIG. 7, the high-temperature exhaust flows inside the exhaust pipe 103. The heat recovery material 105 is thereby heated.

When the heat medium is supplied from the heat medium supply pipe 109 to the heat medium flow passage 107 by a not-illustrated pump, the supplied heat medium flows through the long passage 121 in the heat medium flow passage 107. In this case, the heat of the heat recovery material 105 is transferred through the heat recovery material supporting body 153 to heat the heat medium in the heat medium flow passage 107, and heat recovery is thereby achieved.

The heat medium having flowed through the long passage 121 is collected by the heat medium collection pipe 111.

The exhaust heat recovery device 101 is configured such that almost all of the heat medium supplied from the heat medium supply port 115 flows to the long passage 121 without flowing to the short passage 119 of the heat medium flow passage 107. Turbulence in the flow of the heat medium in the heat medium flow passage 107 (particularly, at the heat medium supply port 115) is thereby suppressed, and the heat recovery efficiency can be improved.

Moreover, in the exhaust heat recovery device 101, the heat medium supply pipe 109 is formed linearly in an elongated manner, and the one end of the heat medium supply pipe 109 in the longitudinal direction is connected to the heat medium flow passage 107. A form of the stream line of the heat medium can be thereby maintained constant in a portion of the heat medium supply port 115 due to force of inertia of the heat medium. Hence, the turbulence in the flow of the heat medium in the portion of the heat medium supply port 115 is suppressed and the heat recovery efficiency can be improved.

Furthermore, in the exhaust heat recovery device 101, the heat medium collection pipe 111 is formed in the long linear tube shape like the heat medium supply pipe 109, and extends adjacent and parallel to the heat medium supply pipe 109 in an elongated manner. The heat medium supply pipe 109 and the heat medium collection pipe 111 thereby extend on one side of the exhaust pipe 103, and space saving can be achieved compared to the case where the heat medium supply pipe and the heat medium collection pipe extend respectively on both sides of the exhaust pipe as in the conventional technique.

Moreover, in the exhaust heat recovery device 101, as viewed in the direction in which the center axis CA1 of the exhaust pipe 103 extends, the extending line of the center axis CA2 of the heat medium supply pipe 109 is arranged away from the center axis CA1 of the exhaust pipe 103 by the predetermined distance. The heat medium flowing out from the heat medium supply port 115 thereby hits the exhaust pipe 103 obliquely. Hence, the resistance of the flow of the heat medium can be reduced.

Furthermore, in the exhaust heat recovery device 101, the end portion of the heat medium supply pipe 109 on the heat medium supply port 115 side protrudes into the annular heat medium flow passage 107. Hence, it is possible to further suppress the flow of the heat medium supplied from the heat medium supply port 115 to the short passage 119 of the heat medium flow passage 107.

Moreover, in the exhaust heat recovery device 101, the end of the heat medium supply pipe 109 on the heat medium supply port 115 side is arranged slightly away from the inner peripheral wall (exhaust pipe 103) of the annular heat medium flow passage 107. Hence, failures due to thermal expansion and vibration can be eliminated. The same effect is obtained also for the heat medium collection pipe 111.

Specifically, if the front end of the heat medium supply pipe 109 is in contact with the exhaust pipe 103, the front end of the heat medium supply pipe 109 may hit an outer wall of the exhaust pipe 103 due to vibration and thermal expansion and generate noise and the like. Moreover, if the front end of the heat medium supply pipe 109 is fixed to the outer wall of the exhaust pipe 103 by welding or the like, the welding portion may break due to thermal expansion or the like. Accordingly, the dimension L2 illustrated in FIG. 8 is set to about 0.5 mm to 2 mm (preferably, about 1.0 mm) and the front end of the heat medium supply pipe 109 is arranged away from the inner wall of the exhaust pipe 103.

Providing a gap between the front end of the heat medium supply pipe 109 and the inner peripheral wall of the heat medium flow passage 107 prevents failures due to thermal expansion and vibration and enables control of the flow of the heat medium.

Furthermore, in the exhaust heat recovery device 101, the end surface 127 of the heat medium supply pipe 109 on the heat medium supply port 115 side is formed as the inclined surface facing the long passage 121. Accordingly, almost all of the heat medium supplied from the heat medium supply port 115 can be made to flow to the long passage 121 of the heat medium flow passage 107 more surely.

Moreover, the end surface 129 of the heat medium collection pipe 111 on the heat medium collection port 117 side is formed as the inclined surface facing the long passage 121. Accordingly, the heat medium in the long passage 121 of the heat medium flow passage 107 can be efficiently collected.

Furthermore, in the exhaust heat recovery device 101, the outer member 131 forming the annular heat medium flow passage 107 is provided with the engagement portion 135 (139) which engages with the engaged portion 133 (137) arranged in the one end portion of the heat medium supply pipe 109 (heat medium collection pipe 111) on the heat medium supply port 115 side (heat medium collection port 117 side). In addition, the heat medium supply pipe 109 (heat medium collection pipe 111) is configured to be positioned by engaging the engaged portion 133 (137) with the engagement portion 135 (139) when the heat medium supply pipe 109 (heat medium collection pipe 111) is installed to the outer member 131. Accordingly, assembly of the exhaust heat recovery device 101 can be accurately and quickly performed.

In the exhaust heat recovery device 101, the heat medium supply pipe 109 may be arranged further away from the center axis CA1 of the exhaust pipe 103.

Figure 10:
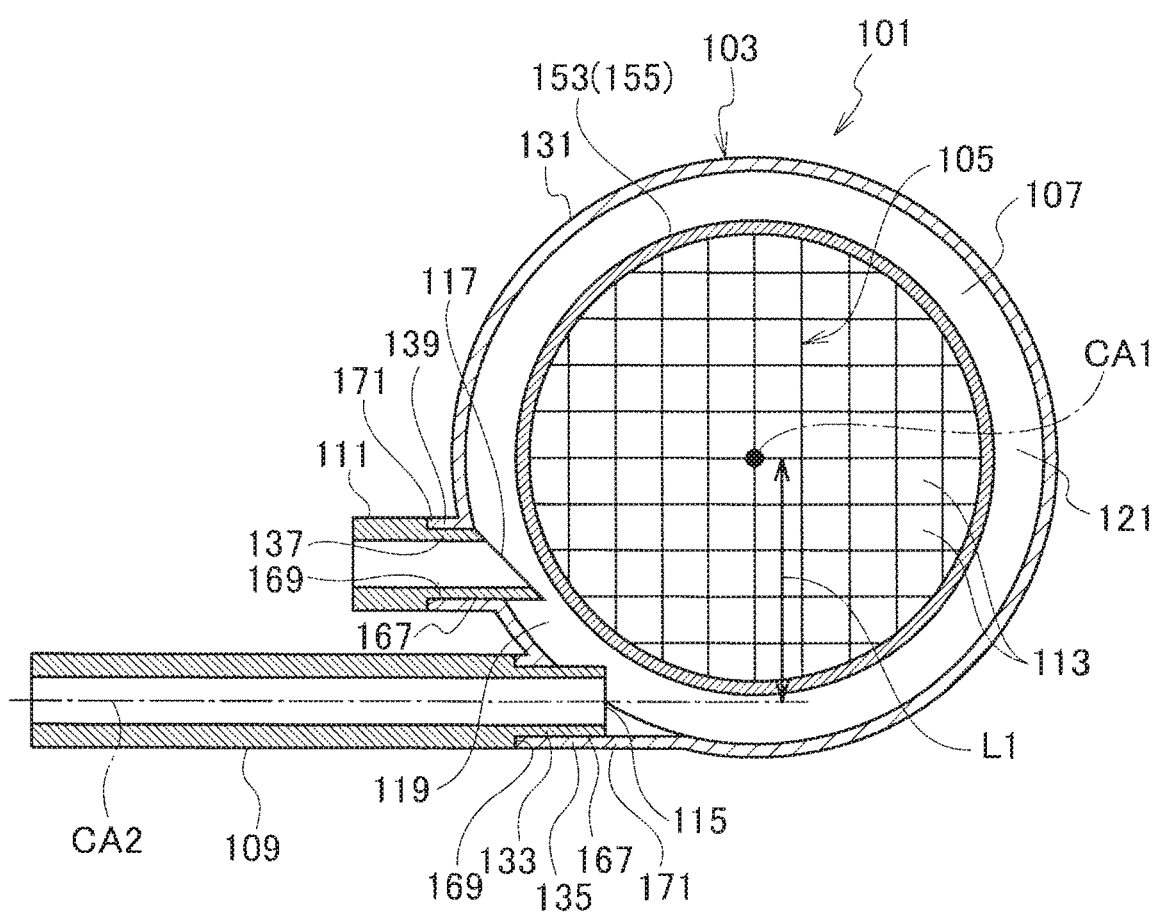
FIG. 10 is a view illustrating a schematic configuration of an exhaust heat recovery device in a modified example of the second embodiment and is a view corresponding to FIG. 8.

For example, as illustrated in FIG. 10, as viewed in the direction in which the center axis CA1 of the exhaust pipe 103 extends, the extending line of the heat medium supply pipe 109 in the longitudinal direction (extending line of the center axis CA2) may be arranged away from the center axis CA1 of the exhaust pipe 103 by a distance approximately equal to the radius of the heat medium flow passage 107.

In this case, as viewed in the direction in which the center axis CA1 of the exhaust pipe 103 extends, the heat medium collection port 117 is preferably arranged between the center axis CA1 of the exhaust pipe 103 and the heat medium supply port 115 in the direction orthogonal to the extending line of the center axis CA2 of the heat medium supply pipe 109 (up-down direction in FIG. 10).

Configuring the exhaust heat recovery device 101 as described above allows almost all of the heat medium supplied from the heat medium supply port 115 to more surely flow to the long passage 121 of the heat medium flow passage 107. Moreover, the flow resistance of the heat medium can be further reduced.

As described above, the present invention includes various embodiments which are not described herein as a matter of course. Accordingly, the technical scope of the present invention is determined only by the matters to define the invention in the scope of claims regarded as appropriate from the aforementioned description.

The entire contents of Japanese Patent Application Nos. 2014-015112 (filed Jan. 30, 2014) and 2014-015117 (filed Jan. 30, 2014) are incorporated herein by reference.

The invention claimed is:

1. An exhaust heat recovery device comprising:
an exhaust pipe through which exhaust flows;
a heat recovery material arranged in the exhaust pipe, comprising through holes independent from one another, and recovering heat of the exhaust;
a heat medium flow passage formed in an annular shape and arranged outside an outer periphery of the heat recovery material, the heat medium flow passage being structured such that heat medium flows through the heat medium flow passage, and directly recovers by thermal conduction the heat recovered by the heat recovery material; and
an exhaust restriction portion arranged in the exhaust pipe and suppressing a flow of the exhaust to through holes of the through holes adjacent to the heat medium flow passage,
wherein the exhaust restriction portion
is arranged upstream of the heat recovery material in a flow direction of the exhaust, and
has a tubular shape with an inner diameter smaller than an outer diameter of the heat recovery material, and
wherein the heat recovery material consists of
first wall portions extending in the flow direction of the exhaust, and
second wall portions intersecting with the first wall portions, the first wall portions and the second wall portions forming through holes extending in the flow direction of the exhaust.

2. The exhaust heat recovery device according to claim 1, wherein the exhaust pipe comprises a tubular heat recovery material supporting body, the heat recovery material is arranged inside the heat recovery material supporting body and at an intermediate portion of the heat recovery material supporting body, and the exhaust restriction portion comprises a diameter-decreased portion extending into the heat recovery material supporting body.

3. The exhaust heat recovery device according to claim 2, wherein the diameter-decreased portion has a tapered shape with an inner diameter smaller toward the heat recovery material.

4. The exhaust heat recovery device according to claim 2, wherein the diameter-decreased portion has a tubular shape with a constant inner diameter and a constant outer diameter, the outer diameter of the tubular shape being smaller than the outer diameter of the heat recovery material.

* * * * *